W. B. MORSE.
TRAILER.
APPLICATION FILED FEB. 20, 1912.
1,119,106.
Patented Dec. 1, 1914.
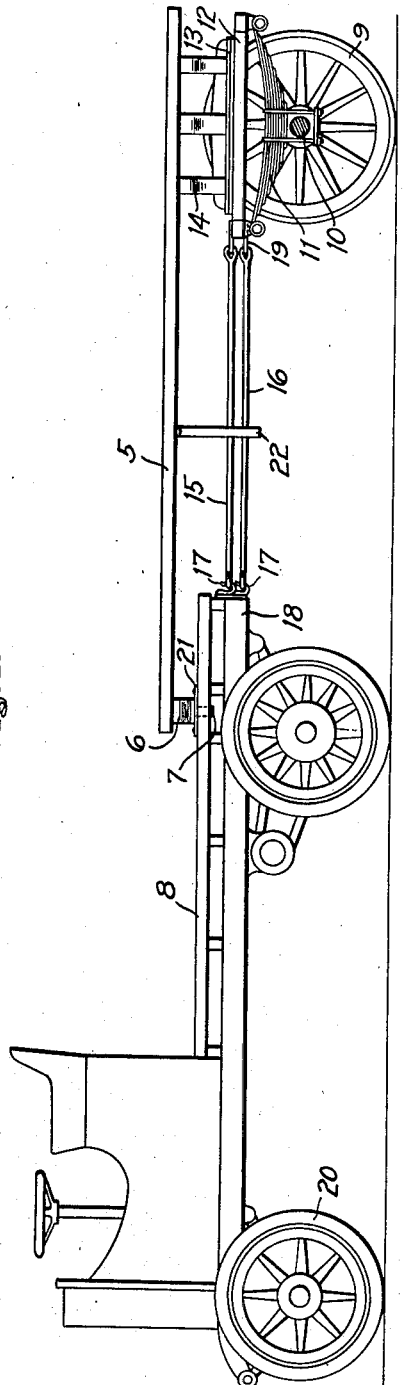
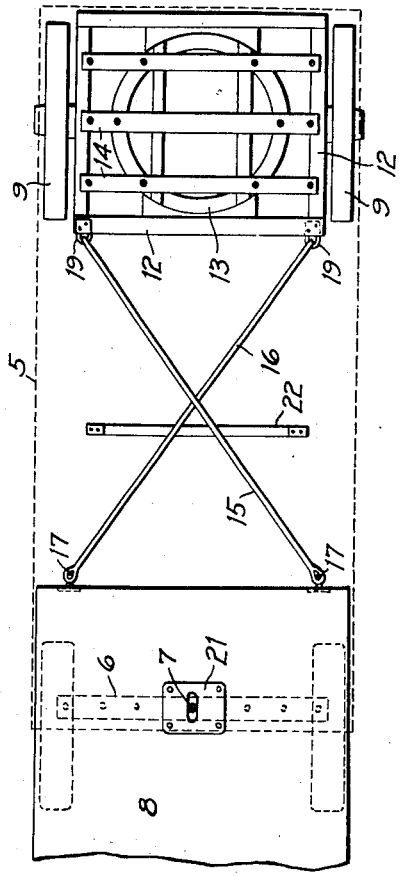
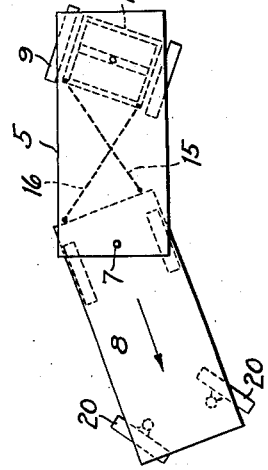
Witnesses:
Clarence W. Carroll
L. Thon
Inventor:
Whiting B. Morse
by his attorneys
Osgood, Davis & Dorsey

UNITED STATES PATENT OFFICE.

WHITING B. MORSE, OF ROCHESTER, NEW YORK.

TRAILER.

1,119,106.

Specification of Letters Patent. Patented Dec. 1, 1914.

Application filed February 20, 1912. Serial No. 678,969.

*To all whom it may concern:*

Be it known that I, WHITING B. MORSE, a citizen of the United States, and resident of Rochester, in the county of Monroe and State of New York, have invented certain new and useful Improvements in Trailers, of which the following is a specification.

This invention relates to trailers, such as are employed in connection with motor-trucks or other vehicles, to carry loads of lumber or other material which cannot conveniently be supported upon the body of the vehicle.

It has heretofore been proposed, in connection with vehicles having either four or six wheels, to employ pivoted axles for two pairs of the wheels and to connect these axles by means of crossed rods, whereby the axles are caused to swing simultaneously in opposite directions to facilitate the steering of the vehicle.

The present invention relates to a construction by which this method of steering is adapted, in a simple and effective manner, to a trailer which is employed in connection with a motor-truck, or other vehicle having a platform body, the present invention involving a novel construction and arrangement of the steering connections and of the connections between the trailer-body and the vehicle-body, whereby the trailer is made readily detachable from the vehicle-body, so that the trailer may be loaded and unloaded while so detached, thus enabling the use of the vehicle, if desired, in connection with a plurality of trailers.

The invention is particularly useful in connection with motor-trucks, such as are commonly used in the transportation of lumber and similar materials. Such a truck is usually provided with a body of the platform-type, which projects to a substantial distance in the rear of the rear-wheels of the truck. This arrangement is adopted in order that the greater part of the load carried by the vehicle may rest upon the rear wheels, so as to secure sufficient traction for driving the vehicle, the power for this purpose being applied to the rear wheels. Where a trailer is employed in connection with such a vehicle it is necessary that the trailer be so constructed and so connected with the vehicle-body that at least 50% of the load carried by the trailer shall be supported by the traction-wheels of the vehicle. It is accordingly necessary to support the forward end of the trailer-body upon the truck-body at a point substantially in advance of the rear end of the latter. On the other hand, the rear end of the truck-body constitutes the most convenient point for the attachment of the crossed rods by which the trailer is steered, and this point is substantially in the rear, therefore, of the point at which the trailer-body is supported upon and pivotally connected with the body of the truck. In order to compensate for this relative position of the pivotal attachment and of the connecting points for the steering-rods, I do not attach the steering-rods to the rear axle of the trailer, in the manner in which these rods have been heretofore employed, but I attach them instead to the forward portion of a frame which is pivotally connected with the rear part of the trailer-body, and which is supported upon the springs and the rear axle of the trailer. In this manner the steering-rods are pivoted to the frame at a point substantially as far in advance of the axle of the trailer as their forward ends are pivoted in the rear of the point of support of the trailer-body upon the truck-body, while at the same time the steering-rods occupy a substantially horizontal position, upon the level of the platform-body of the truck or the frame upon which it is immediately supported. By this arrangement I largely avoid the relative longitudinal movement of the trailer and the truck, which would otherwise be produced by the action of the steering-rod when the vehicle changes its direction of movement. At the same time, however, the location of the trailer-body and of the steering-rods upon different horizontal planes from that in which the axle of the trailer lies, tends to produce a certain degree of relative longitudinal movement between the trailer-body and the truck-body, in consequence of inequalities in the road-surface upon which the truck and the trailer move. To permit such relative movement to occur freely, I employ a pivotal connection between the trailer and the truck by which lateral movement of the forward end of the trailer is prevented or limited, while longitudinal movement is freely permitted, and I further employ steering-rods which are sufficiently rigid to assume the entire duty of both pulling and pushing the trailer, according as the truck is moved forwardly or backwardly.

By the foregoing arrangements I produce a trailer of simple and inexpensive construction, which may be readily attached to or detached from a truck of ordinary form and construction, and which moves freely and without severe strain upon any of its parts, under all conditions of use.

Figure 1 is a side-elevation of a motor-vehicle provided with a trailer, one wheel of the trailer being removed to disclose more clearly the steering-mechanism; Fig. 2 is a plan-view showing the rear part of the vehicle and the running-gear of the trailer, the platform of the trailer being removed; and Fig. 3 is a diagrammatic plan-view illustrating the steering-action of the trailer.

A trailer constructed in accordance with the present invention is illustrated as connected with a motor-truck of ordinary construction. The platform 5 of the trailer is provided, near its forward end, with a cross-bar 6, which is connected, by means of a pivot-pin 7, to the platform 8 of the vehicle. The rear portion of the trailer is supported by a pair of wheels 9, journaled upon an axle 10 which is connected, by springs 11 of ordinary form, with a frame 12. The frame 12 is pivotally connected with the platform of the trailer by a familiar construction including fifth-wheels 13, so that the rear wheels, the axle, the springs and the frame 12 constitute a pivoted wheel-truck adapted to steer the trailer as well as to support it. The upper fifth-wheel is connected, by cross-bars 14, with the platform of the trailer. The steering movements of the wheel-truck just described are produced by means of two rods 15 and 16, which are connected, at their forward ends, to hooks 17 fixed to the frame 18 of the vehicle on opposite sides thereof. The rear ends of the rods 15 and 16 are pivotally connected with eyes 19 on opposite sides of the frame 12 of the wheel-truck. The rods are crossed, as shown particularly in Figs. 2 and 3, and are separated vertically enough to prevent interference between them when the trailer is tilted laterally with respect to the vehicle. Owing to the arrangement of the rods 15 and 16, and particularly to the fact that they are crossed as above described, these members act, whenever the body of the vehicle is swung to an angular position with respect to the trailer, to swing the wheel-truck through a corresponding angle in the opposite direction. Fig. 3 illustrates this action when the front steering-wheels 20 of the vehicle are swung to the left so as to turn a corner, or follow a path curving to the left. The first result of this movement of the steering-wheels is to swing the body of the vehicle to the left. This produces an angular movement with respect to the trailer. In consequence of this angular movement the rod 16 is pulled and the rod 15 pushed so as to swing the left-hand end of the axle 10 forwardly. The wheel-truck thus swings to an angular position with respect to the platform 5 opposite to the angular movement of the body of the vehicle. Accordingly, as the vehicle and the trailer move forwardly, the wheel-truck tends to swing the trailer toward the curved path followed by the vehicle. As the trailer swings in this direction, however, the rods 15 and 16 return in a corresponding degree toward normal position, so that the wheel-truck gradually returns toward straight-forward position. As a result of this automatic action the trailer follows the vehicle at an angle thereto, this angle being greater or less in inverse proportion to the radius of the curve followed by the vehicle, and being always less than the angle which the trailer would assume in the absence of automatic provision for steering it.

To facilitate the application of my improved trailer to a vehicle of ordinary construction without substantial changes in the frame of the vehicle, I do not employ the pivot 7 as the means for pulling the trailer, or for pushing it in backing the vehicle, but employ instead, for this purpose, the steering-rods 15 and 16, these rods being made sufficiently stiff and strong for this purpose. Owing to this arrangement it is unnecessary to confine the pivot 7 closely against fore-and-aft movement, since its only necessary function is to prevent lateral movement of the forward end of the trailer with respect to the vehicle. Accordingly, the platform 8 of the vehicle is provided with a plate 21 which is slotted to receive the pivot, as shown in Fig. 2. This arrangement permits sufficient play to compensate for all relative movements of the trailer and the vehicle which may result from passage over irregular road-surfaces, curves and the like, the distance between the wheel-truck of the trailer and the rear end of the vehicle being determined by the steering-rods, while the pivot slides freely backward and forward in the plate 21. The arrangement just described, together with the hooks 17 engaging eyes at the forward ends of the steering-rods 15 and 16, permits the trailer to be readily attached to, and detached from, the vehicle, it being necessary, in detaching it, merely to raise its forward end so as to free the pivot 7 from the plate 21 and at the same time to raise the forward ends of the steering-rods to free them from the hooks. This is a valuable feature of the arrangement since it permits several trailers to be used in connection with the vehicle, one or more of the trailers being loaded, while another is being drawn from place to place. To support the rods 15 and 16 when the trailer is detached from the vehicle a bail-shaped rod 22 is fixed to the bottom of the platform 5 and depends beneath the rods.

I claim:—

The combination, with a vehicle having a platform-body, of a trailer comprising a platform-body projecting, for a substantial distance, over the rear-portion of the vehicle-body; a pair of wheels for supporting the rear-portion of the trailer-body; an axle and springs connected with the wheels; a frame resting on the springs and having a swivel-connection with the body of the trailer; a pair of crossed rods pivoted to the frame near its sides and at a substantial distance in front of the axle; means, at the rear extremity of the vehicle-body, for detachably securing the forward ends of the rods, the rods being sufficiently rigid to act as tension-members and compression-members, to pull or push the trailer as the vehicle moves forwardly or backwardly; and connections, between the forward end of the trailer-body and the vehicle-body, comprising a pin on one body and a socket on the other body, adapted to receive the pin loosely and elongated to permit longitudinal movement of the pin therein, said connections being located substantially in advance of the rear-extremity of the vehicle-body and serving to support the trailer-body and to prevent lateral movement of its forward end with respect to the vehicle-body, while permitting free longitudinal movement to compensate for inequalities in the road-surface and for the action of said rods.

WHITING B. MORSE.

Witnesses:
 FARNUM F. DORSEY,
 D. GURNEE.